United States Patent
Murakami et al.

(10) Patent No.: US 8,760,591 B2
(45) Date of Patent: Jun. 24, 2014

(54) TELEVISION APPARATUS AND ELECTRONIC DEVICE

(75) Inventors: Mitsuhiro Murakami, Tachikawa (JP); Masataka Tokoro, Tachikawa (JP); Kohei Wada, Tachikawa (JP); Tetsuo Okazaki, Hino (JP); Ryosuke Kasaya, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 24 days.

(21) Appl. No.: 13/092,015

(22) Filed: Apr. 21, 2011

(65) Prior Publication Data
US 2011/0310316 A1 Dec. 22, 2011

(30) Foreign Application Priority Data
Jun. 18, 2010 (JP) .................... 2010-139823

(51) Int. Cl.
*H04N 5/64* (2006.01)
(52) U.S. Cl.
CPC ...................................... *H04N 5/64* (2013.01)
USPC ............................................................ 348/836
(58) Field of Classification Search
None
See application file for complete search history.

(56) References Cited

U.S. PATENT DOCUMENTS

2009/0303674 A1* 12/2009 Tatsukami et al. ....... 361/679.21
2010/0246107 A1* 9/2010 Matsushima et al. .... 361/679.01

FOREIGN PATENT DOCUMENTS

| JP | H02-116724 | 9/1990 |
| JP | H04-094068 | 3/1992 |
| JP | H09-275262 | 10/1997 |
| JP | H10-289764 A | 10/1998 |
| JP | 2009-301757 | 12/2009 |
| JP | 2010-003442 A | 1/2010 |
| JP | 2010-086556 A | 4/2010 |

OTHER PUBLICATIONS

JPO, Notification of Reasons for Rejection, dated Nov. 22, 2011.

* cited by examiner

*Primary Examiner* — Mehrdad Dastouri
*Assistant Examiner* — James Anderson, II
(74) *Attorney, Agent, or Firm* — Knobbe, Martens Olson & Bear LLP (57) ABSTRACT

According to one embodiment, a television apparatus includes a housing and a connector. The connector is supported by the housing in the state where a connection portion of the connector to which another connector is detachably connectable is exposed outside the housing. The connector includes a first terminal and a second terminal, each coupled with a harness. The first terminal is located on a lateral face of the connector and includes a planate first harness coupling portion. The second terminal includes an end wall portion that is bent in a direction away from the first terminal at the fore-end of a salient wall portion protruding from the lateral face. The end wall portion is provided with a second harness coupling portion.

5 Claims, 7 Drawing Sheets

TELEVISION APPARATUS AND ELECTRONIC DEVICE

CROSS-REFERENCE TO RELATED APPLICATIONS

This application is based upon and claims the benefit of priority from Japanese Patent Application No. 2010-139823, filed on Jun. 18, 2010, the entire contents of which are incorporated herein by reference.

FIELD

Embodiments described herein relate generally to a television apparatus and an electronic device.

BACKGROUND

Typically, known electronic devices have a connector in which a plug can be inserted.

With regard to such electronic devices, there is a demand for enhancing the general versatility of a connector unit.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a television apparatus comprises a housing and a connector. The connector is configured to be supported by the housing in the state where a connection portion of the connector to which another connector is detachably connectable is exposed outside the housing. The connector comprises a first terminal and a second terminal, each coupled with a harness. The first terminal is located on a lateral face of the connector and comprises a planate first harness coupling portion. The second terminal comprises an end wall portion that is bent in a direction away from the first terminal at the fore-end of a salient wall portion protruding from the lateral face. The end wall portion is provided with a second harness coupling portion.

According to another embodiment, an electronic device comprises a housing and a connector. The connector is configured to be supported by the housing in the state where a connection portion of the connector to which another connector is detachably connectable is exposed outside the housing. The connector comprises a first terminal and a second terminal, each coupled with a harness. The first terminal is located on a lateral face of the connector and comprises a planate first harness coupling portion. The second terminal comprises an end wall portion that is bent in a direction away from the first terminal at the fore-end of a salient wall portion protruding from the lateral face. The end wall portion is provided with a second harness coupling portion.

In the embodiments described below, the identical constituent elements are referred to by the same reference numerals, and repetition is avoided in the explanation of such constituent elements. In the accompanying drawings, "UP" represents the upper side in the operating state.

Figure 1:
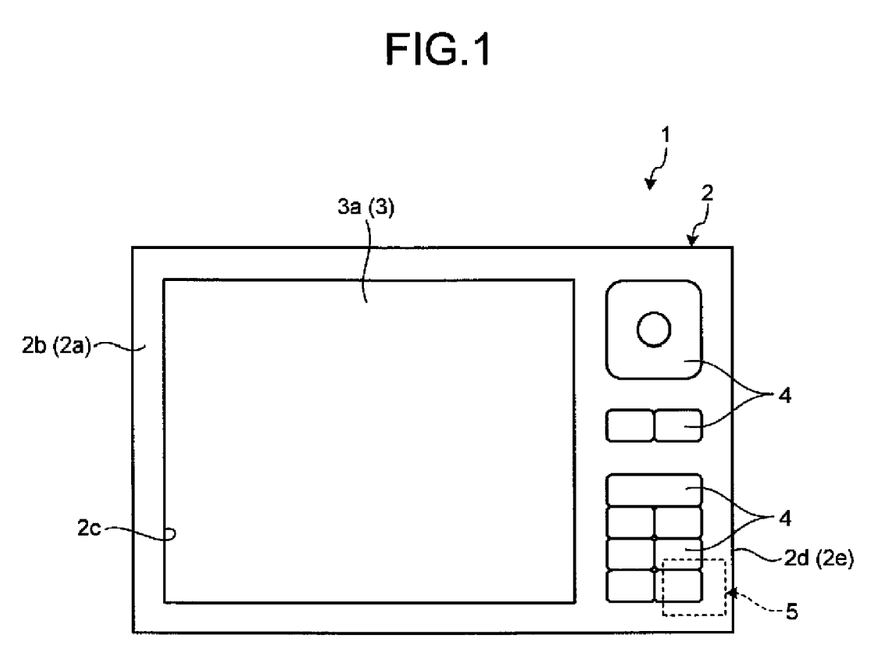
FIG. 1 is an exemplary front view of a television apparatus as an electronic device according to a first embodiment.

As illustrated in FIG. 1, a television apparatus 1 as an electronic device according to a first embodiment comprises a main body 2 with a housing 2a that is rectangular in appearance when viewed from the front and that is formed in the shape of a thin and flat rectangular parallelepiped in the front-back direction perpendicular to the plane of paper of FIG. 1. In the present embodiment, the television apparatus 1 is assumed to be a comparatively compact apparatus.

The television apparatus 1 comprises a display panel 3 such as a liquid crystal display (LCD) and a circuit board (not illustrated). The display panel 3 is a display device (display) having a display screen 3a exposed anteriorly from an opening 2c formed on a front face 2b of the housing 2a. The circuit board has electronic components such as a central processing unit (CPU) mounted thereon.

The display panel 3 is formed in the shape of a thin and flat rectangular parallelepiped in the front-back direction. The display panel 3 receives video signals from a video signal processing circuit (not illustrated), which is one of the control circuits (not illustrated) configured with the electronic components mounted on the circuit board. Then, the display panel 3 displays video including still images and moving images on the display screen 3a that is positioned in the front. Apart from the video signal processing circuit, the control circuits (not illustrated) in the television apparatus 1 include a tuner module, a high-definition multimedia interface (HDMI) signal processing module, an audio-video (AV) input terminal, a remote control signal receiving module, a control module, a selector, an on-screen display interface, a memory module (such as a read only memory (ROM), a random access memory (RAM), or a hard disk drive (HDD)), and an audio signal processing circuit. The circuit board (circuit board assembly) is housed behind (on the rear side of) the display panel 3 inside the housing 2a. Meanwhile, the television apparatus 1 has built-in amplifiers or speakers (not illustrated) for the purpose of audio output. Moreover, a touch panel is disposed in front of the display panel 3.

On the front face 2b of the housing 2a are disposed a plurality of operation buttons 4. The user operates the operation buttons 4 or the touch panel with the aim of performing various input operations such as channel selection, volume adjustment, or data input. In the present embodiment, the touch panel and the operation buttons 4 correspond to input operation modules.

Inside the housing 2a is housed a connector 5. On a side wall 2e constituting a lateral face 2d of the housing 2a, a slot (not illustrated) is formed in the shape of, for example, a circular through hole. At least a connection portion 8 (see FIG. 2) of the connector 5 is exposed laterally (in the present embodiment, exposed on the right-hand side in the front view of FIG. 1) from the slot. In the present embodiment, the connector 5 is configured as, for example, a connector in which a plug of an AC adapter (AC-DC adapter) (i.e., another connector) can be detachably inserted.

As illustrated in FIGS. 2 to 6, the connector 5 is configured in the shape of a rectangular parallelepiped in entirety, and comprises a main body 6 made of a synthetic resin material having insulating property and a shell 7 that encircles the periphery of the main body 6 in a U-shaped manner and that is made of a metallic material having conductive property.

The main body 6 is formed in the shape of a rectangular parallelepiped having a front face 6a, a rear face 6b, a left lateral face 6c, a right lateral face 6d, a top face 6e, and a bottom face 6f. On the front face 6a, the connection portion 8 is formed as a depressed portion having a circular cross-section. Meanwhile, each of the abovementioned faces corresponds to a lateral face of the main body 6. Moreover, for the sake of convenience, the naming of the abovementioned faces is decided with reference to the front face 6a, on which the connection portion 8 is formed. Thus, the naming does not confine in anyway the functions or the orientation. The same is the case regarding the naming of the constituent elements of the shell 7. Besides, for the sake of convenience, three directions, namely, X, Y, and Z directions are defined with reference to the front face 6a in FIGS. 2 to 6. When viewed from the front of the front face 6a, the horizontal direction (width direction) is defined as the X direction, the depth direction is defined as the Y direction, and the vertical direction (height direction, thickness direction) is defined as the Z direction. Herein, the X axis, the Y axis, and the Z axis are mutually orthogonal.

Figure 2:
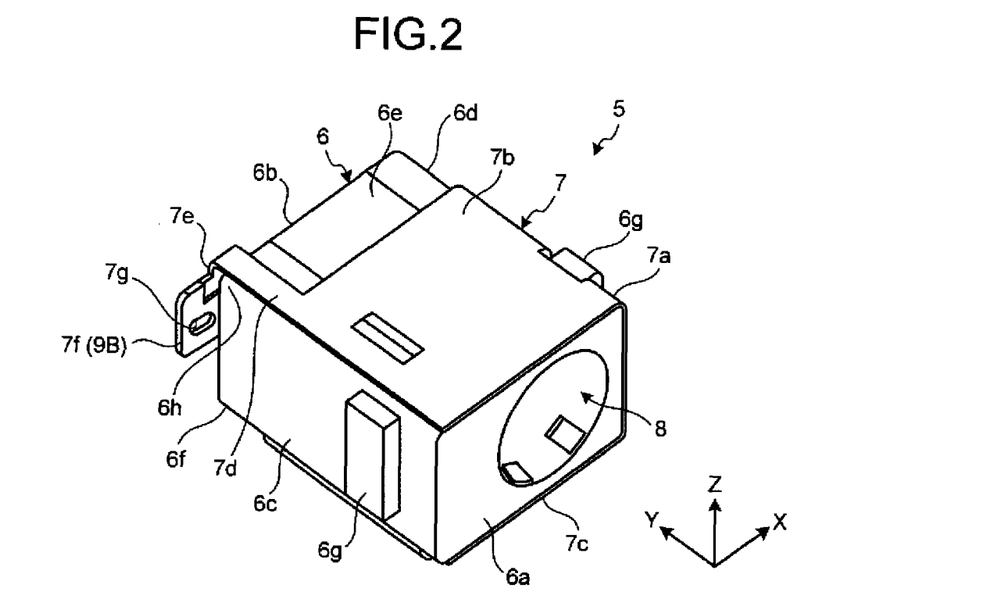
FIG. 2 is an exemplary front perspective view (viewed from slot side) of a connector disposed in the television apparatus in the first embodiment.

Inside the connection portion 8 are disposed a signal terminal (not illustrated) and a grounding terminal (not illustrated). Moreover, inside the connection portion 8 is disposed a blade spring (not illustrated) that functions as a biasing mechanism for preventing detachment of the inserted plug. In the present embodiment, when viewed from the front of the front face 6a of the main body 6, the blade spring is housed in the left side portion of the connection portion 8. Consequently, the main body 6 has a longer width in the horizontal direction (X direction) than the height in the vertical direction (Z direction).

Figure 3:
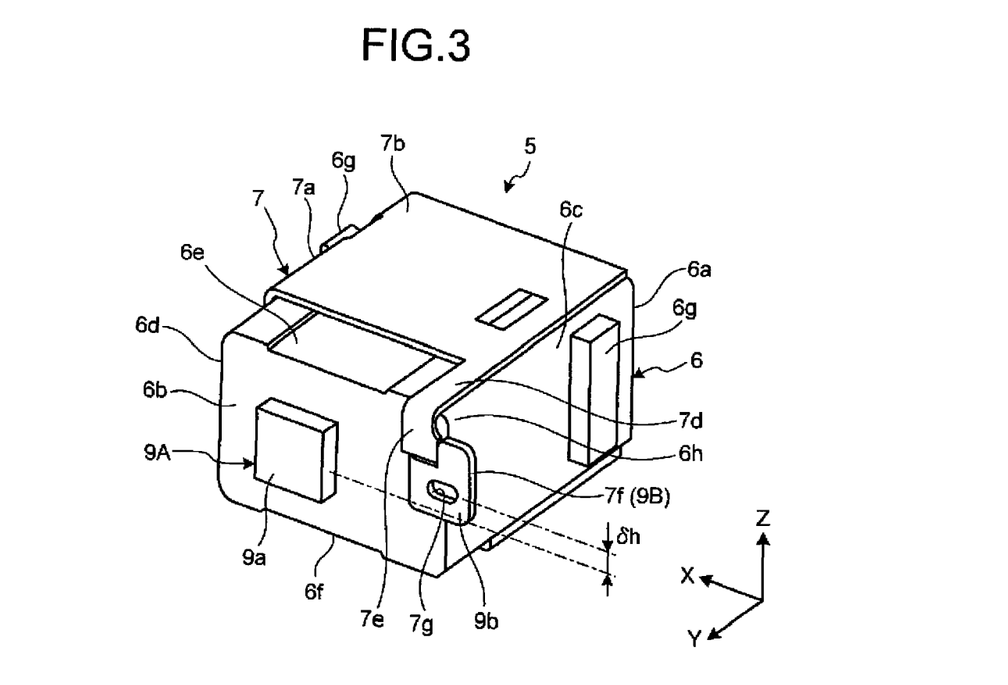
FIG. 3 is an exemplary rear perspective view (viewed from opposite side of slot) of the connector disposed in the television apparatus in the first embodiment.

The shell 7 has a side wall 7a disposed on the right lateral face 6d, a top wall 7b disposed on the top face 6e, and a bottom wall 7c disposed on the bottom face 6f. The side wall 7a, the top wall 7b, and the bottom wall 7c are connected in a U-shaped manner. The shell 7 is installed around the periphery of the main body 6 in such a way that the top face 6e, the right lateral face 6d, and the bottom face 6f of the main body 6 are partially covered by the shell 7. Meanwhile, the shell 7 can be manufactured by press-molding or bend-molding a metallic sheet, and the main body 6 can be manufactured by performing, for example, insert-molding with the shell 7, the terminals, the blade spring, and the like.

On each of the left lateral face 6c and the right lateral face 6d, a salient 6g is disposed that extends along the Z direction. The salients 6g function as guides or positioning members with respect to the mounted portion of the connector 5 inside the housing 2a of the main body 2.

Figure 4:
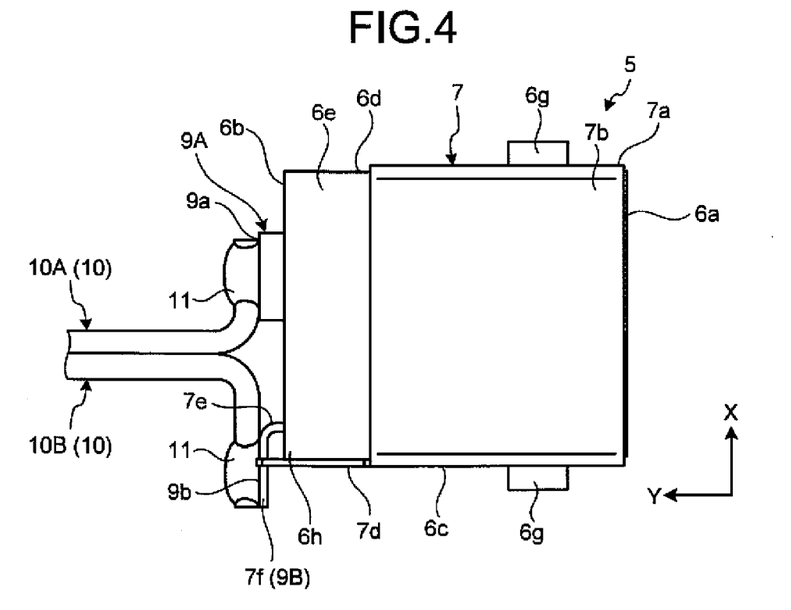
FIG. 4 is an exemplary planar view of a first harness layout state of the connector disposed in the television apparatus in the first embodiment.
Figure 5:
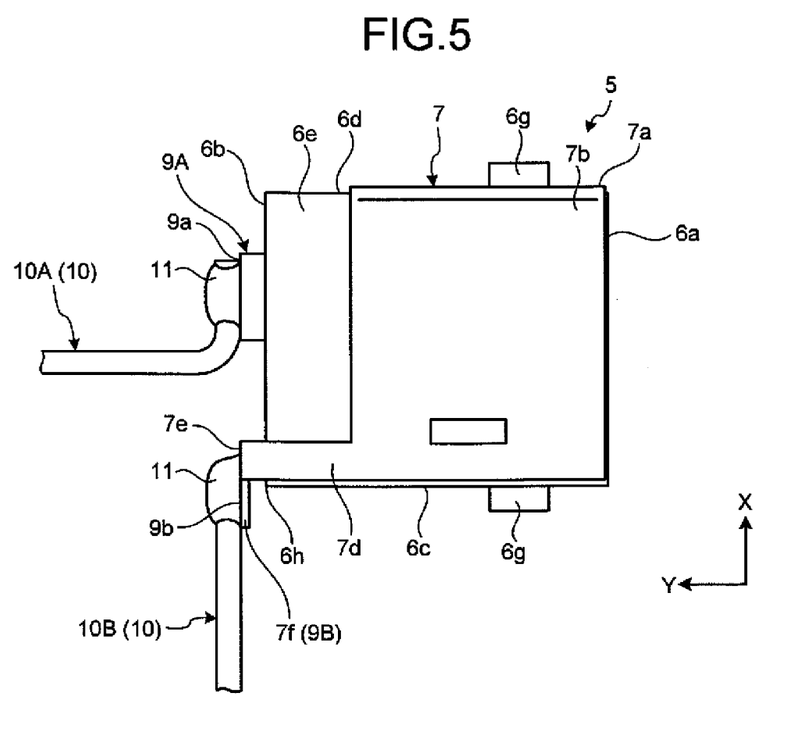
FIG. 5 is an exemplary planar view of a second harness layout state of the connector disposed in the television apparatus in the first embodiment.
Figure 6:
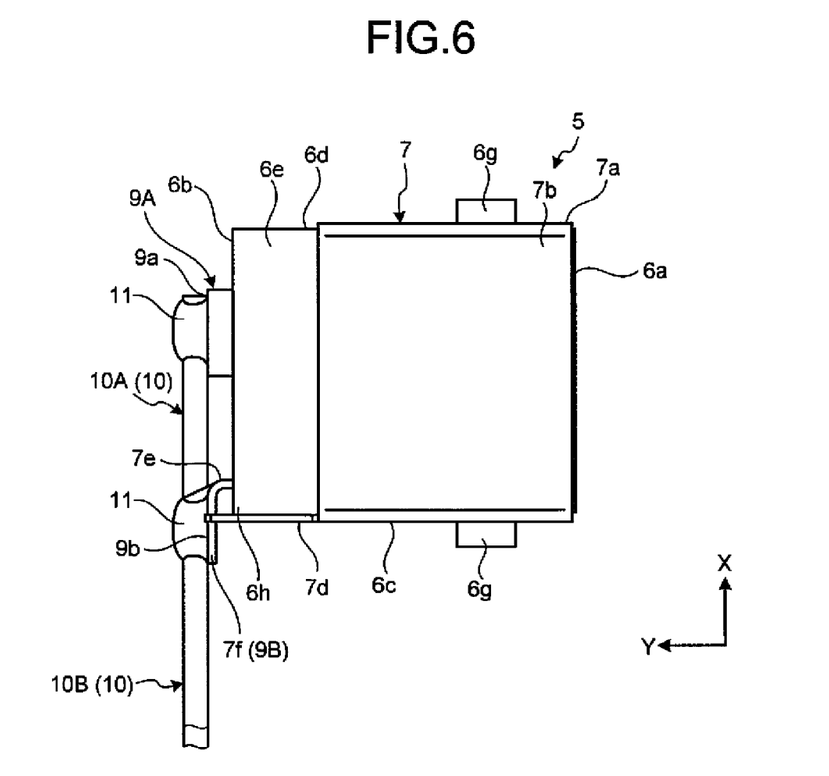
FIG. 6 is an exemplary planar view of a third harness layout state of the connector disposed in the television apparatus in the first embodiment.

As illustrated in FIG. 3, a first terminal 9A is disposed as a signal terminal connected to the signal wire of a harness 10 and a second terminal 9B is disposed as a grounding terminal connected to the grounding wire of another harness 10. As illustrated in FIGS. 4 to 6, the cores (conducting portion) of the harnesses 10 (10A, 10B) are connected to the terminals 9A and 9B using a solder 11 as the bonding material.

The first terminal 9A is disposed as a rectangular (square) salient protruding from the rear face 6b. Moreover, the first terminal 9A is disposed behind the central axis of the connection portion 8, and is electrically connected to the signal terminal inside the connection portion 8.

The second terminal 9B is configured to be a part of the shell 7. More particularly, on the left and rear portion of the top wall 7b of the shell 7, a salient wall portion 7d is formed that extends in a belt-like manner toward the rear side along the top face 6e of the main body 6. The salient wall portion 7d protrudes from a corner 6h, which is formed between the top side, the left side, and the rear side of the main body 6, up to a position spaced apart from the rear face 6b. At the fore-end of the salient wall portion 7d, a bent portion 7e is formed that has a bend in the Z direction. The fore-end of the bent portion 7e is flexed (expanded) in the direction moving away from the first terminal 9A (i.e., in the X direction), so that an end wall portion 7f is formed that protrudes in the X direction. In the present embodiment, the end wall portion 7f corresponds to the second terminal 9B. In the end wall portion 7f is formed an elongated through hole 7g through which the core of the harness 10B can be passed.

A rear face 9a of the first terminal 9A is formed as a flat side on which the core of the harness 10A is bonded in an electrically continuous state using the solder 11 as the bonding material. Thus, in the present embodiment, the rear face 9a corresponds to a first harness coupling portion. The core of the other harness 10B is bonded in an electrically continuous state to the end wall portion 7f using the solder 11 as the bonding material. In the present embodiment, the core of the harness 10B can be bonded to the end wall portion 7f after the core has passed through the through hole 7g. Alternatively, without passing the core of the harness 10B through the through hole 7g, it can be bonded to a rear face 9b of the end wall portion 7f. That is, in the present embodiment, either the rear face 9b or the periphery portion of the through hole 7g corresponds to a second harness coupling portion.

The connector 5 according to the present embodiment is compatible to various layout directions of the harnesses 10. FIG. 4 illustrates a layout state in which both of the harnesses 10A and 10B are laid out in the Y direction. FIG. 5 illustrates a layout state in which the harness 10A is laid out in the Y direction and the harness 10B is laid out in the X direction (i.e., on the left side when viewed from the front of the front face 6a). FIG. 6 illustrates a layout state in which both of the harnesses 10A and 10B are laid out on the same side along the X direction (i.e., on the left side when viewed from the front of the front face 6a). Herein, the layout states in FIGS. 4 to 6 are only exemplary and various other layout states can also be implemented. Meanwhile, the harnesses 10A and 10B can be formed in predetermined shapes to be connected to the terminals 9A and 9B, respectively.

In the layout state illustrated in FIG. 4, each of the harnesses 10A and 10B is bent at a right angle from the base end, at which the harnesses 10A and 10B are bundled together, toward the corresponding fore-end. At that time, if the curvature radii of the flexing portions are too small, then the load on the harnesses 10A and 10B increases. In order to increase the curvature radii, it is desirable that the rear face 9a serving as the first harness coupling portion and the rear face 9b serving as the second harness coupling portion are spaced apart from each other. In that regard, in the present embodiment, the second terminal 9B has the end wall portion 7f that is formed at the fore-end side of the salient wall portion 7d and that is flexed in the direction away from the first terminal 9A, and the rear face 9b is formed as the second harness coupling portion on the end wall portion 7f. For that reason, the rear face 9a serving as the first harness coupling portion and the rear face 9b serving as the second harness coupling portion can be further spaced apart from each other thereby making it easier to reduce the load on the harnesses 10A and 10B. Besides, since the rear face 9a serving as the first harness coupling portion and the rear face 9b serving as the second harness coupling portion are spaced apart from each other, the bonding task using the solder 11 can also be performed without difficulty.

In the present embodiment, when viewed from the front of the rear face 6b of the main body 6 on which the first terminal 9A is disposed, the end wall portion 7f protrudes away from the margin of the rear face 6b, that is, protrudes from the left lateral face 6c up to a position spaced apart in the normal direction. Hence, around the end wall portion 7f, it becomes easier to secure the space for performing the bonding task using the solder 11. Moreover, without having to increase the size of the entire main body 6, the rear face 9a serving as the first harness coupling portion and the rear face 9b serving as the second harness coupling portion can be spaced apart from each other without difficulty.

Moreover, in the present embodiment, as illustrated in FIG. 3, the rear face 9a serving as the first harness coupling portion and the rear face 9b serving as the second harness coupling portion are spaced apart in the Z direction. Herein, the centers of the rear face 9a and the rear face 9b are spaced apart in the Z direction by a distance δh. Thus, when the harnesses 10A and 10B are laid out on the same side along the X direction as illustrated in FIG. 6, the harnesses 10A and 10B can be arranged in the Z direction (in the direction perpendicular to the plane of paper of FIG. 6) without a substantial flexion. That enables achieving reduction in the load on the harnesses 10A and 10B. Hence, the task of laying the harnesses 10A and 10B can be performed more smoothly. Besides, the harnesses 10A and 10B are prevented from easily interfering with each other. Meanwhile, in the present embodiment, the Z direction is the direction along a lateral face of the main body 6 and perpendicular to the direction in which the end wall portion 7f is spaced apart from the first terminal 9A.

In the present embodiment, as described above, the salient wall portion 7d protrudes from the corner 6h of the main body 6. Hence, the rear face 9a serving as the first harness coupling portion and the rear face 9b serving as the second harness coupling portion can be further spaced apart without difficulty in the oblique direction intersecting the X direction and the Z direction.

Moreover, in the present embodiment, the shell 7 that encircles the periphery of the main body 6 is a ground electrode. That makes it easier to secure electrical continuity with the shell 7. Hence, it is easier to build a configuration in which the ground potential is the standardized potential. Particularly, in the present embodiment, since the shell 7 is disposed over a relatively wider area on the three faces, namely, the right lateral face 6d, the top face 6e, and the bottom face 6f, an electronic device such as the television apparatus 1 can be easily built to have a configuration in which the ground potential is the standardized potential. Moreover, the shell 7 helps in enhancing the tolerance and strength of the connector 5.

Besides, in the present embodiment, it is desirable to dispose the connector 5 inside the housing 2a with an orientation in which the Z direction of the connector 5 is same as the thickness direction of the housing 2a (i.e., same as the direction perpendicular to the plane of paper of FIG. 1). That is, it is desirable that the connector 5 is formed in the shape of a thin rectangular parallelepiped in the thickness direction of the housing 2a. That makes it easier to configure a thinner housing 2a.

Moreover, it is desirable that the end wall portion 7f is bent in the direction perpendicular to the thickness direction of the housing 2a. That is, in the configuration illustrated in FIG. 1, it is desirable that the end wall portion 7f be bent upward or downward with reference to FIG. 1. As a result, the connector 5 that has an increased width in the X direction because of the flexion and protrusion of the end wall portion 7f can be disposed inside without difficulty a thinner housing 2a.

According to the present embodiment, a greater variety of layout states of the harnesses 10 can be implemented. That enables achieving enhancement in the general versatility of the electronic device. Moreover, since the salient wall portion 7d restricts the connector 5 from increasing in height, the configuration can also be implemented for a thin electronic device.

Meanwhile, as a modification example, a configuration (not illustrated) is possible in which the rear face 9a serving as the first harness coupling portion and the rear face 9b serving as the second harness coupling portion are spaced apart in the Y direction, that is, in the protruding direction of the salient wall portion 7d. In that case also, the same effect can be achieved as achieved in the first embodiment, and the harnesses 10A and 10B can be prevented from easily interfering with each other.

Figure 7:
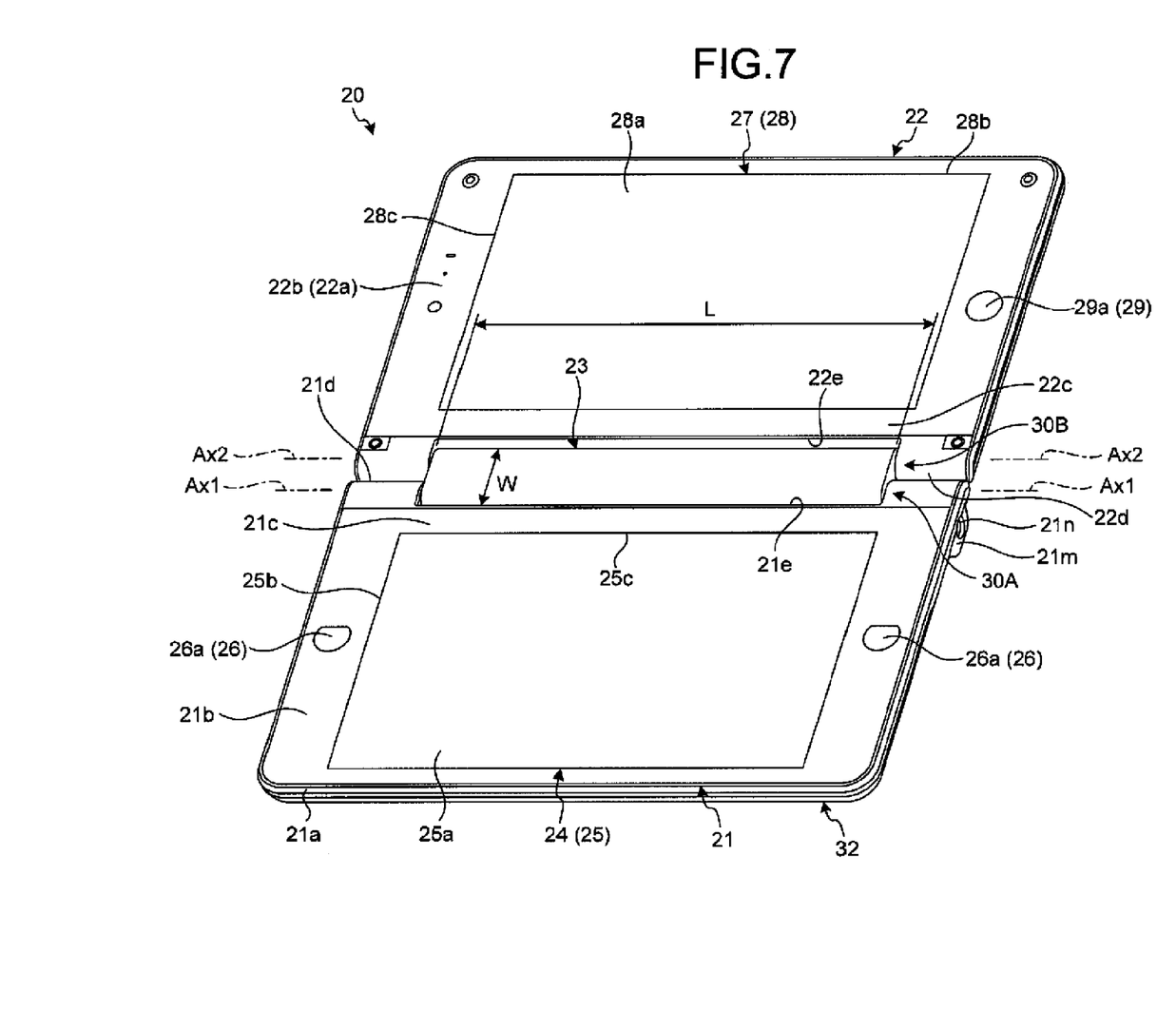
FIG. 7 is an exemplary perspective view of an open state of a personal computer (PC) as an electronic device according to a second embodiment.

According to a second embodiment, a notebook personal computer (PC) 20 as an electronic device comprises a rectangular and flat first main body 21 and a rectangular and flat second main body 22 as illustrated in FIG. 7. The first main body 21 and the second main body 22 are connected in a relatively rotatable manner via a joint 23.

In the first main body 21, a display panel 25 such as an LCD, which is a display device having a touch panel 24 on the front face (i.e., on a display screen 25a), and a push button mechanism 26 are arranged in an exposed manner on a front face 21b that is the external face of a housing 21a. Similarly, in the second main body 22, a display panel 28 such as an LCD, which is a display device having a touch panel 27 on the front face (i.e., on a display screen 28a), and a push button mechanism 29 are arranged in an exposed manner on a front face 22b that is the external face of a housing 22a.

In the open state illustrated in FIG. 7, the display panel 25 and cover bodies 26a of the push button mechanism 26 as well as the display panel 28 and a cover body 29a of the push button mechanism 29 lie in an exposed condition. In such a state, the user is able to perform operations. In contrast, in a folded state (not illustrated), the front faces 21b and 22b face each other from up close in such a way that the display panel 25 and the cover bodies 26a of the push button mechanism 26 are hidden by the housing 21a, while the display panel 28 and the cover body 29a of the push button mechanism 29 are hidden by the housing 22a. In the present embodiment, the touch panels 24 and 27, the push button mechanisms 26 and 29, and a microphone (not illustrated) function as input operation modules, while the display panels 25 and 28 and speakers (not illustrated) function as output operation modules. Meanwhile, in the PC having a keyboard, or click buttons, or a pointing device (not illustrated), the keyboard or the click buttons also function as input operation modules.

The joint 23 connects the first main body 21 with the second main body 22, and is configured separately from the first main body 21 and the second main body 22. The joint 23 connects an end portion 21c at the base end of the first main body 21 with an end portion 22c at the base end of the second main body 22. At the central part in the longitudinal direction of an end edge 21d of the end portion 21c and at the central part in the longitudinal direction of an end edge 22d of the end portion 22c, rectangular notches 21e and 22e are formed, respectively, except over the respective ends. Each of the rectangular notches 21e and 22e has a long opening along the longitudinal direction and has only a shallow depth. Half of the joint 23 is inserted in the notch 21e and the remaining half thereof is inserted in the notch 22e. A length L of the joint 23 is set to be slightly shorter than the width of the notches 21e and 22e. Moreover, a width W of the joint 23 is set to be substantially equal to the thickness when the first main body 21 and the second main body 22 are closed together in the folded state.

The first main body 21 and the joint 23 are connected in a relatively rotatable manner around a rotation axis Ax1 via a first hinge mechanism 30A. Similarly, the second main body 22 and the joint 23 are connected in a relatively rotatable manner around a rotation axis Ax2 via a second hinge mechanism 30B. The rotary shafts Ax1 and Ax1 lie parallel to each other. In the present embodiment, the first hinge mechanism 30A and the second hinge mechanism 30B are coupled together so that the relative rotation angle around the rotation axis Ax1 of the first main body 21 with respect to the joint 23 is identical to the relative rotation angle around the rotation axis Ax2 of the second main body 22 with respect to the joint 23. However, the two relative rotation directions with respect to the joint 23 are opposite to each other. Thus, when the user operates the joint 23 for the purpose of opening either one of the first main body 21 and the second main body 22, the PC 20 falls into the open state. Similarly, when the joint 23 is operated for the purpose of closing either one of the first main body 21 and the second main body 22, the PC 20 falls into the folded state. Moreover, when the user opens the first main body 21 and the second main body 22, the PC 20 falls into the open state. Similarly, when the first main body 21 and the second main body 22 are closed, the PC 20 falls into the folded state.

Figure 8:
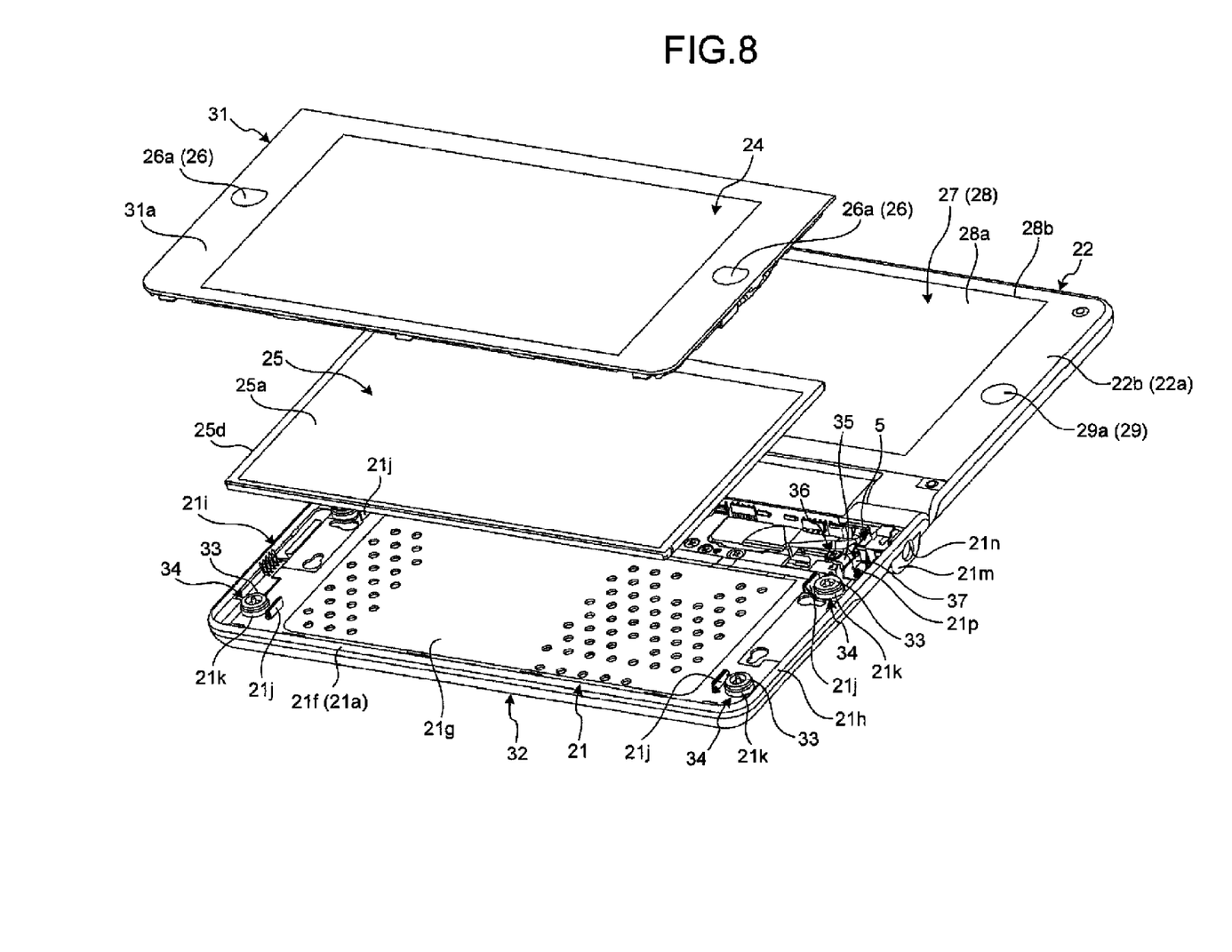
FIG. 8 is an exemplary exploded perspective view of a first main body of the PC in the second embodiment.

In the present embodiment, a circuit board with at least some of the control circuits including electronic components mounted thereon is disposed, for example, inside the housing 22a of the second main body 22. On the other hand, in the first main body 21, a battery 32 is disposed as a power supply behind (on the rear side of) the display panel 25. Thus, in the present embodiment, the circuit board having principal electronic components such as a CPU mounted thereon and the battery 32 are separately disposed in the second main body 22 and the first main body 21, respectively. In case the circuit board and the battery 32 are disposed together in either one of the first main body 21 and the second main body 22, then following inconveniences are more likely to occur. For example, the thickness of the main bodies increases or, if there is a restriction on the thickness, then it becomes necessary to reduce the size and eventually the capacity of the battery 32. In contrast, in the present embodiment, since the circuit board and the battery 32 are separately disposed in the second main body 22 and the first main body 21, respectively, it becomes easier to avoid the abovementioned inconveniences.

Herein, each of the display panels 25 and 28 is formed in the shape of a flat rectangular parallelepiped, and receives display signals from control circuits (not illustrated) configured with the electronic components (not illustrated) mounted on the circuit board (not illustrated). Moreover, each of the display panels 25 and 28 displays video including still images and moving images. In the present embodiment, the light that represents the video displayed on the display screens 25a and 28a of the display panels 25 and 28, respectively, is output anteriorly via the display panels 25 and 28, respectively, which are colorless and transparent in nature. The control circuits in the PC 20 include a control module, a memory module (such as a ROM, a RAM, or an HDD), an interface circuit, and various controllers. Meanwhile, the PC 20 also has built-in speakers (not illustrated) for the purpose of audio output.

Meanwhile, the PC 20 according to the present embodiment can be used in a first orientation in which a side 28b of the display screen 28a and a side 25c of the display screen 25a are positioned on the upper side and can be used in a second orientation in which another side 28c of the display screen 28a and another side 25b of the display screen 25a are positioned on the upper side. In the present embodiment, the abovementioned control circuits also include a video control mechanism (not illustrated) that controls the video to be displayed on the display screens 25a and 28a depending on the orientation of the first main body 21 and the second main body 22, respectively. Hence, in the PC 20 according to the present embodiment, the orientation of the video to be displayed on the display screens 25a and 28a changes depending on the orientation of the PC 20. Meanwhile, an orientation sensor can be disposed for the purpose of detecting the orientation of the PC 20.

The housing 21a is configured as a casing 21f on the rear side of the display panel 25. The casing 21f has rectangular bottom wall 21g and a peripheral wall 21h erected along the periphery of the bottom wall 21g. A depressed portion 21i is formed by the bottom wall 21g and the peripheral wall 21h, and the display panel 25 and a touch panel unit 31 are housed in the depressed portion 21i.

The display panel 25 is mounted on the bottom wall 21g. Moreover, on the bottom wall 21g, a plurality of ribs 21j are disposed at positions spaced apart from a lateral face 25d of the display panel 25. The ribs 21j function not only as positioning members for positioning the display panel 25 but also as impact absorbing members that undergo deformation upon being pushed by the display panel 25 when the display panel 25 moves in the transverse direction under the inertia force. Meanwhile, in between the display panel 25 and the ribs 21j, it is possible to dispose an elastic member made of elastomer or the like.

The touch panel unit 31 comprises the touch panel (main body) 24 and a rectangular frame 31a that encircles the periphery of the touch panel 24. The touch panel 24 and the frame 31a are integrated by attaching to the front face thereof a cover (not illustrated) made of a film, a sheet, or a panel of colorless and transparent nature.

Moreover, in the present embodiment, an oscillation support mechanism 34 oscillatably supports the touch panel unit 31 on the bottom wall 21g mainly along the in-plane direction of the display screen 25a. The oscillation support mechanism 34 comprises a boss portion 21k that protrudes from the bottom wall 21g and an elastic bush 33 that is fit to the boss portion 21k. With the elastic bush 33 present in between the frame 31a and the boss portion 21k, the touch panel unit 31 is fixed to the casing 21f with screws or the like.

Figure 9:
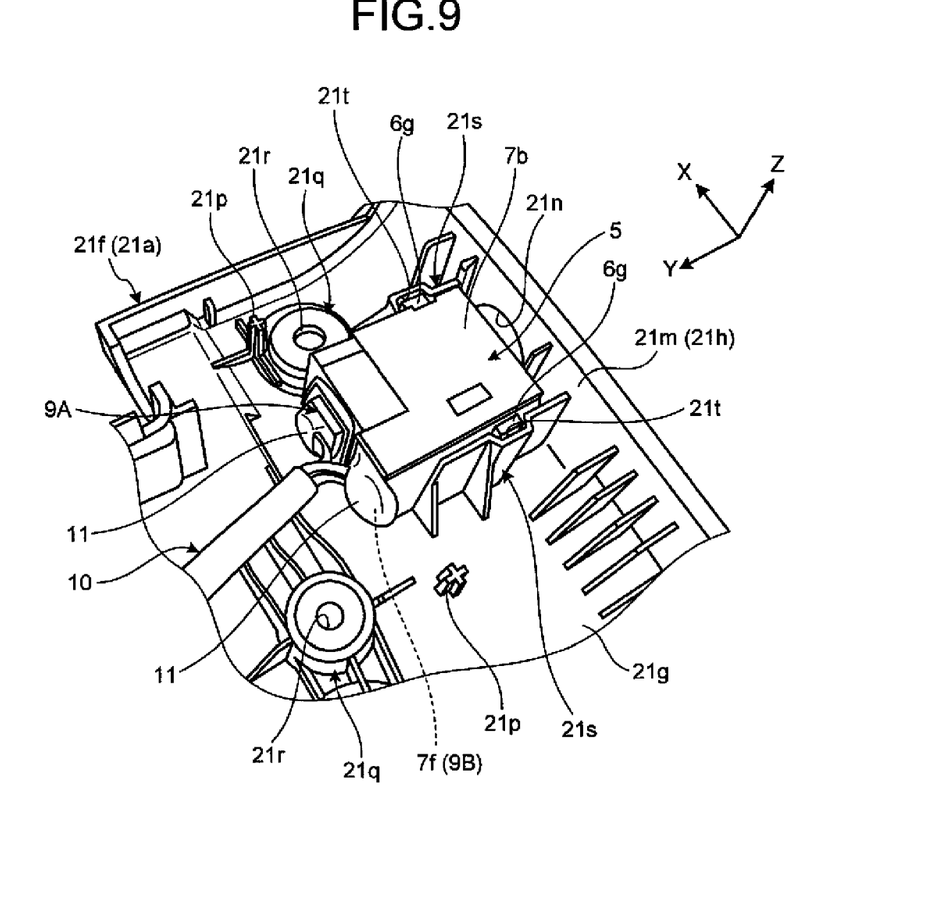
FIG. 9 is an exemplary perspective view of a portion inside the first main body of the PC in the second embodiment.

Furthermore, in the present embodiment, at that corner inside the casing 21f which is close to the second main body 22, the connector 5 is disposed. Herein, the connector 5 is identical to the connector 5 disposed in the television apparatus 1 according to the first embodiment.

On an outer wall 21m of the housing of the connector 5, a through hole 21n is formed that serves as a slot for inserting the plug connected to the connector 5. The connector 5 is disposed in such a way that the connection portion 8 (see FIG. 2) is exposed to the outside via the through hole 21n. Meanwhile, on the bottom wall 21g is disposed a pair of wall-like ribs 21s spaced apart in a parallel fashion. The connector 5 is inserted in between the pair of ribs 21s. Because of the pair of ribs 21s, the connector 5 gets positioned on and engaged to the casing 21f (housing 21a) in the horizontal direction (direction perpendicular to the plug insertion direction and parallel to the bottom wall 21g). On the mutually-facing inner faces of the ribs 21s are formed grooves 21t for the purpose of receiving the salients 6g, which are formed on the left lateral face 6c and the right lateral face 6d of the connector 5. The salients 6g engage with the grooves 21t so that the connector 5 is positioned and engaged in the insertion direction thereof.

The connector 5 is covered with a fixed member 37 (not illustrated in FIG. 9, see FIG. 8) from the opposite side of the bottom wall 21g. With the aim of fixing the fixed member 37 to the casing 21f, the fixed member 37 is engaged with a salient 21p that protrudes from the bottom wall 21g and coupled with a boss portion 21q having a female screw hole 21r with the use of a screw 36. The fixed member 37 is in contact with the top wall 7b of the shell 7 and is made of an electrically-conductive material such as a metallic material. Since the fixed member 37 is in contact with the top wall 7b of the shell 7 of the connector 5, it gets electrically connected to the ground electrode of the shell 7, that is, to the ground electrode of the connector 5. Moreover, as illustrated in FIG. 8, in that particular portion is present a bracket 35 that is for the purpose of fixing the first hinge mechanism 30A (see FIG. 7) to the casing 21f (housing 21a). In the present embodiment, the configuration can be simplified by sharing the screw 36, which serves as a fastening member, and the salient 21p for the purpose of fixing the connector 5, the fixed member 37, and the bracket 35. Moreover, since the bracket 35 is made of an electrically-conductive material such as a metallic material and since the bracket 35 is fixed in contact with each other, the shell 7, the fixed member 37, and the bracket 35 are electrically connected to each other. That enables achieving standardization of the ground potential. The first hinge mechanism 30A is entirely made of an electrically-conductive material such as a metallic material and is connected to the inside of the housing 22a of the second main body 22 through the joint 23. Thus, according to the present embodiment, the first hinge mechanism 30A can be used to standardize the ground potential between the inside of the housing 21a of the first main body 21 and the inside of the housing 22a of the second main body 22.

To the connector 5 is connected the harnesses 10 that are laid out in the first layout state illustrated in FIG. 4. However, depending on the electronic device, the layout state of the harnesses 10 can be suitably modified.

Even in the PC 20 according to the present embodiment, since the connector 5 is disposed that is substantially identical to the connector 5 according to the first embodiment, the same effect can be achieved as achieved in the first embodiment. Particularly, as can be seen in FIG. 9, in the present embodiment also, the connector 5 is attached to the housing 2a with such an orientation that the connector 5 is lower in height in the thickness direction of the housing 21a (i.e., in an orientation in which the thickness direction of the housing 21a is same as the Z direction of the connector 5). That makes it easier to configure a thinner housing 21a.

While the abovementioned embodiments are described as being applied to a television apparatus or a notebook PC having two display screens, the embodiments may be applicable to other electronic devices having at least a single display screen such as computers (notebook computers or desktop computers), personal digital assistants (PDAs), smartbooks, or cellular phones having a single display screen.

Moreover, regarding the electronic device, the display device, the display screen, the housing, the connector, the harness, the main body, the shell, the salient wall portion, the end wall portion, the connection portion, the first terminal, and the second terminal, the specifications (method, structure, shape, material, size, number, direction, type, arrangement, pole number, etc.) can be suitably modified.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television comprising:
a housing;
a connector supported by the housing and exposed to outside of the housing, the connector comprising
a first face at which the connector is opened,
a second face located opposite the first face and to which a first terminal is provided, and
a third face extended between the first face and the second face, wherein
a first harness coupling portion is provided to the first terminal; and
a shell configured to cover a portion of the connector, and comprising
a portion extended along the third face, and
a portion extended along the second face in a direction separating from the first terminal, and to which a hole is provided, wherein
a harness is configured to pass through the hole and be connected in an electrically continuous state to the portion extended along the second face.

2. An electronic device comprising:
a housing; and
a connector supported by the housing and exposed to outside of the housing, the connector comprising
a first face through which the connector is opened,
a second face located opposite the first face and to which a first harness coupling portion is provided, and
a third face extended between the first face and the second face,
a shell configured to cover a portion of the connector, and comprising
a first portion extended along the third face between the first face and the second face, and
a second portion connected to the first portion and extended in a direction separating from the first harness coupling portion, and
a second harness coupling portion opened at the second portion, wherein a harness is configured to be connected in an electrically continuous state to the second harness coupling portion.

3. The electronic device of claim 1, wherein, when viewed from the front of the second face, the hole is located outward from a periphery of the second face.

4. The electronic device of claim 1, wherein
the housing is formed in a flat rectangular parallelepiped shape, and
the second portion protrudes in a direction orthogonal to a thickness direction of the housing.

5. The electronic device of claim 1, wherein the connector is formed in a thin rectangular parallelepiped shape in a thickness direction of the housing.

* * * * *